(12) United States Patent
Wang et al.

(10) Patent No.: US 11,510,060 B2
(45) Date of Patent: Nov. 22, 2022

(54) METHOD AND A DEVICE FOR DETECTING WIRELESS NETWORK SECURITY

(71) Applicant: SHANGHAI LIANSHANG NETWORK TECHNOLOGY CO., LTD., Shanghai (CN)

(72) Inventors: Zhen Wang, Shanghai (CN); Di Gao, Shanghai (CN)

(73) Assignee: SHANGHAI LIANGSHANG NETWORK TECHNOLOGY CO., LTD., Shanghai (CN)

( * ) Notice: Subject to any disclaimer, the term of this patent is extended or adjusted under 35 U.S.C. 154(b) by 84 days.

(21) Appl. No.: 17/068,844

(22) Filed: Oct. 13, 2020

(65) Prior Publication Data

US 2021/0044980 A1    Feb. 11, 2021

Related U.S. Application Data (63) Continuation of application No. PCT/CN2018/124523, filed on Dec. 27, 2018.

(30) Foreign Application Priority Data

Apr. 13, 2018    (CN) .......................... 201810330630.3

(51) Int. Cl.
*H04W 12/122* (2021.01)
*H04L 9/40* (2022.01)
*H04W 84/12* (2009.01)

(52) U.S. Cl.
CPC ....... *H04W 12/122* (2021.01); *H04L 63/0272* (2013.01); *H04W 84/12* (2013.01)

(58) Field of Classification Search
CPC .. H04L 63/0272; H04W 12/03; H04W 12/08; H04W 12/122; H04W 12/67;

(Continued)

(56) References Cited

U.S. PATENT DOCUMENTS

| 7,710,933 | B1 * | 5/2010 | Sundaralingam ... H04W 12/069 713/168 |
| 8,442,445 | B2 * | 5/2013 | Mody ................... H04W 12/79 455/67.11 |

(Continued)

FOREIGN PATENT DOCUMENTS

| CN | 101488855 A | 7/2009 |
| CN | 103051601 A | 4/2013 |

(Continued)

*Primary Examiner* — Nathan S Taylor
(74) *Attorney, Agent, or Firm* — Kilpatrick Townsend & Stockton, LLP (57) ABSTRACT

Embodiments of the present application are to provide a method for detecting wireless network security. The method comprises: establishing a wireless connection between a user equipment and a target wireless access point; obtaining security detection information on a wireless local area network where the user equipment is located; and classifying the security detection information and determining security status information corresponding to the wireless local area network based on the security detection information. The present application detects the connected wireless network, obtains corresponding security detection information based on security detection items, and classifies the security detection information and determines security status information corresponding to the wireless local area network according to the security detection information. In the present application, the security detections performed on the currently connected wireless network are more comprehensive, which reduces potential risks that users may encounter.

18 Claims, 1 Drawing Sheet

(58) Field of Classification Search
CPC ..... H04W 24/08; H04W 48/18; H04W 76/10; H04W 84/12; H04W 12/12; H04W 12/121
See application file for complete search history.

(56) References Cited

U.S. PATENT DOCUMENTS

| | | | | |
|---|---|---|---|---|
| 2005/0128989 | A1* | 6/2005 | Bhagwat | H04L 29/12367 370/338 |
| 2006/0070113 | A1* | 3/2006 | Bhagwat | H04W 12/128 455/410 |
| 2006/0168653 | A1* | 7/2006 | Contrera | G06F 21/34 726/9 |
| 2008/0052779 | A1* | 2/2008 | Sinha | H04L 9/002 726/25 |
| 2008/0069102 | A1* | 3/2008 | Koehler | H04L 61/5014 370/392 |
| 2009/0007246 | A1* | 1/2009 | Gutowski | H04L 63/20 726/6 |
| 2011/0164749 | A1* | 7/2011 | Natarajan | H04L 9/0869 380/270 |
| 2015/0365381 | A1* | 12/2015 | Durbin | H04W 12/08 726/15 |
| 2015/0382198 | A1* | 12/2015 | Kashef | H04W 8/20 726/5 |
| 2016/0308837 | A1* | 10/2016 | Baliga | H04L 63/0272 |
| 2017/0126705 | A1* | 5/2017 | Mirashrafi | H04L 63/102 |
| 2017/0134956 | A1* | 5/2017 | Radpour | H04W 12/08 |
| 2018/0213574 | A1* | 7/2018 | Bareket | H04L 67/143 |
| 2018/0292522 | A1* | 10/2018 | Cavendish | H04L 9/3297 |

FOREIGN PATENT DOCUMENTS

| | | |
|---|---|---|
| CN | 103634786 A | 3/2014 |
| CN | 103828297 A | 5/2014 |
| CN | 104426708 A | 3/2015 |
| CN | 108566656 A | 9/2018 |
| EP | 1502389 A1 | 2/2005 |

* cited by examiner

FIG. 1

FIG. 2

METHOD AND A DEVICE FOR DETECTING WIRELESS NETWORK SECURITY

CROSS-REFERENCES TO RELATED APPLICATIONS

This application is the continuation application of International Application No. PCT/CN2018/124523, filed on Dec. 27, 2018, which is based upon and claims priority to Chinese Patent Application No. 201810330630.3, filed on Apr. 13, 2018, the entire contents of which are incorporated herein by reference.

FIELD

The present application relates to communication, and more particularly relates to a technology for detecting wireless network security.

BACKGROUND OF THE DISCLOSURE

With the development and popularity of smart phones, people increasingly rely on wireless networks in their daily lives. Compared with connection scenarios of traditional PCs, mobile environment of wireless networks have more changes. Considering that there are many open wireless networks to which many devices can access, security risks currently are more likely to exist in the wireless networks and thus are difficult to prevent. Currently, there are many types of security detection for wireless networks, such as ARP spoofing, DNS spoofing, SSL man-in-the-middle attacks and so on. These security detection items are highly professional and are complicated to operate. Ordinary users cannot well understand corresponding security risk based on security warnings.

SUMMARY OF THE DISCLOSURE

One embodiment of the present application is to provide a method and a device for detecting wireless network security.

According to an aspect of the present application, it is provided a method for detecting wireless network security. The method comprises:

establishing a wireless connection between a user equipment and a target wireless access point;

obtaining security detection information of a wireless local area network where the user equipment is located; and classifying the security detection information and determining security status information corresponding to the wireless local area network based on the security detection information.

According to another aspect of the present application, it is provided a method for detecting wireless network security. The device comprises:

a processor; and a memory arranged to store computer executable instructions, when executed, cause the processor to:

establish a wireless connection between a user equipment and a target wireless access point;

obtain security detection information of a wireless local area network where the user equipment is located; and classify the security detection information and determine security status information corresponding to the wireless local area network based on the security detection information.

According to an aspect of the application, it is provided a computer readable medium comprising instructions, when executed, cause a system to:

establish a wireless connection between a user equipment and a target wireless access point;

obtain security detection information of a wireless local area network where the user equipment is located; and classify the security detection information and determine security status information corresponding to the wireless local area network based on the security detection information.

Compared with the prior art, the present application detects the connected wireless network, obtains corresponding security detection information based on security detection items, and classifies the security detection information and determines security status information corresponding to the wireless local area network according to the security detection information. In the present application, the security detections performed on the currently connected wireless network are more comprehensive, which reduces potential risks that users may encounter. The security status information determined based on the classification of the security detection information can assist a user to well understand the current condition of the network, which enables the user to effectively select corresponding measures according to the current condition of the network, and thus professional requirements for the security detection are reduced and use experience of the user is improved. Further, the user equipment may transmit security status information of various wireless access points to a server. The server statistically analyzes and determines security evaluation information of various wireless access points. Users may select, based on the security evaluation information of various wireless access points, a wireless network with high security with which to establish a wireless connection, to guarantee the security of transmission of user data to an extent, and thus use experience of the user is improved.

DETAILED DESCRIPTION OF THE DISCLOSURE

Embodiments of the present application will become more apparent by reading the detailed description of with reference to the following drawings.

The identical or similar reference numerals in the drawings represent the identical or similar components.

DETAILED EMBODIMENTS

The application is further described in detail below with reference to the accompanying drawings.

In a typical configuration of the present application, a terminal, a device of a service network and a trusted party all include one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device.

The devices referred to in the present application include, but are not limited to, user equipments, network devices, or devices formed by the integration of user equipments and network devices through a network. User equipments include but are not limited to any type of mobile electronic products capable of human-machine interaction with users (e.g., via touchpads), for example, an intelligent phone, a tablet, etc. The mobile electronic products can run on any operating system, such as android operating system, iOS operating system, etc. Network devices include an electronic device of automatically performing numeral calculations and information processing according to preset or stored instructions. The hardware includes but is not limited to micro-processors, application specific integrated circuits (ASIC), programmable logic device (PLD), field programmable gate array (FPGA), digital signal processors (DSP), embedded devices, etc. Network devices include but are not limited to: computers, mainframes, single network server, a cloud composed of multiple network server sets or multiple servers. Cloud as used herein is formed by a massive amount of computers or network servers based on cloud computing, and cloud computing is a type of distributed computing, which is a virtual super computer composed of a group of loosely coupled computer sets. Networks include but are not limited to internet, Wide Area Network (WAN), Metropolitan Area Network (MAN), Local Area Network (LAN), Virtual Private Network (VPN), wireless ad-hoc network, etc. In one embodiment, the device may also be programs running on user equipments, network devices, or user equipments and network devices, network devices, touch terminals, or a device composed by integration of network devices and touch terminals through a network.

In the description of the present application, the term "a plurality of" means two or more, unless it is clearly and specifically defined otherwise.

Figure 1:
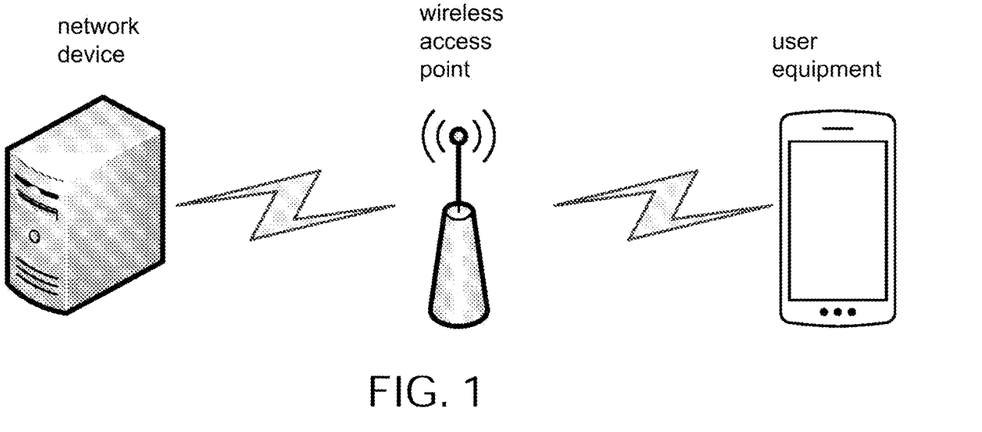
FIG. 1 shows a topology diagram of a system for detecting wireless network security according to an embodiment of the present application.

FIG. 1 shows a typical scenario of the present application in which a user equipment establishes a wireless connection with a wireless access point, obtains security detection information on the wireless local area network, and determines security status information of the current wireless network according to the security detection information. This process may be done locally at the user equipment, or may be done with cooperation of the user equipment and a network device.

Figure 2:
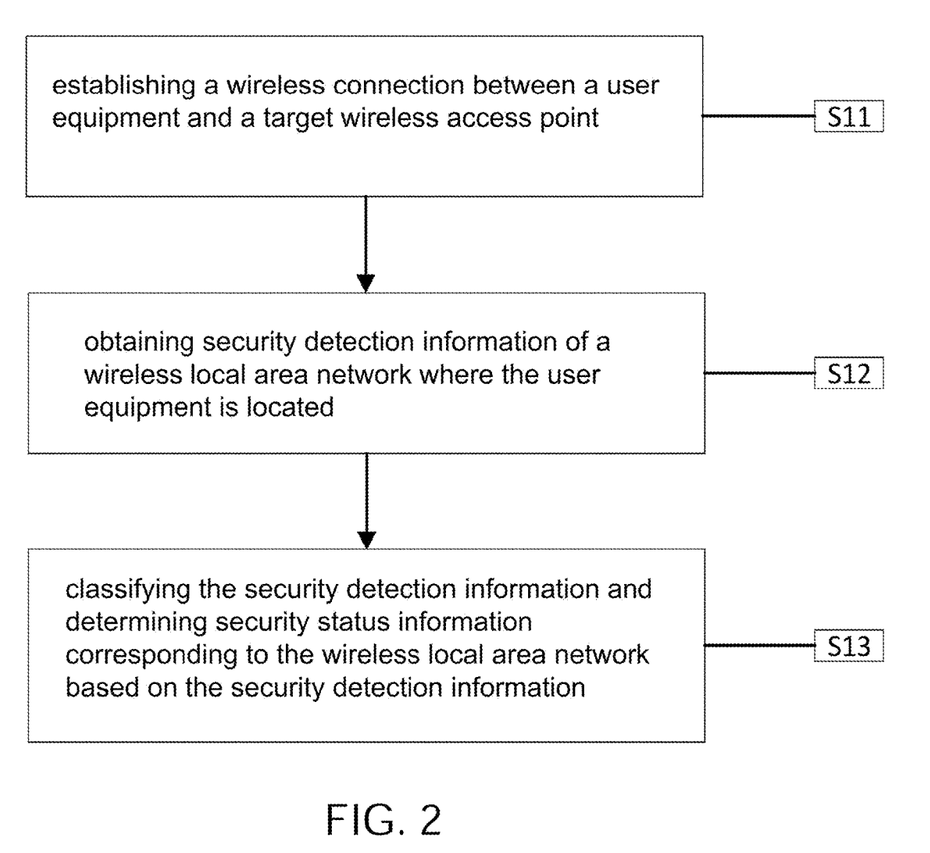
FIG. 2 shows a flowchart of a method for detecting wireless network security according to an embodiment of the present application.

FIG. 2 shows a method for detecting wireless network security according to an aspect of the present application. The method comprises: Step S11, Step S12, Step S13 and Step S14. At Step S11, a user equipment establishes a wireless connection between the user equipment and a target wireless access point. At Step S12, the user equipment obtains security detection information of a wireless local area network where the user equipment is located. At Step S13, the user equipment classifies the security detection and determines security status information corresponding to the wireless local area network based on the security detection.

In one embodiment, at Step S11, the user equipment establishes a wireless connection between the user equipment and a target wireless access point. For example, a user holds a user equipment. The user equipment scans connectable wireless access points around, and establishes a wireless connection with a target wireless access point. The target wireless access point comprises a connectable wireless access point determined by the user equipment, or a pre-connected wireless access point determined by the user equipment based on the user's operation.

At Step S12, the user equipment obtains security detection information on a wireless local area network where the user equipment is located. For example, the user equipment performs various security detection items on the wireless local area network where the user equipment is currently located, and obtains corresponding security detection information according to results of the security detection items. The security detection information includes, but is not limited to security detection items such as DNS (Domain Name System) Spoofing detection, ARP (Address Resolution Protocol) attack detection, SSL (Secure Sockets Layer) man-in-the-middle attack detection, fake hotspot detection, hotspot WAP2 loophole detection, connected device detection, network encryption detection, etc. As another example, the user equipment transmits access point-related information of the target wireless access point to a network device. The network device queries for security detection information corresponding to the target wireless access point from a database based on the access point-related information, and returns the security detection information to the user equipment. The network device stores security detection information on various wireless access points, and updates corresponding security detection information according to related results uploaded by user equipments.

At Step S13, the user equipment classifies the security detection information and determines security status information corresponding to the wireless local area network based on the security detection information. The security status information includes, but is not limited to: whether the wireless local area network is encrypted; whether the wireless local area network is being monitored; whether the wireless local area network would jump to a phishing website; whether the wireless local area network would leak sensitive information; whether the wireless local area network is a fake hotspot; whether there is a WAP2 loophole in the wireless local area network; a number of devices connected to the wireless local area network; etc. For example, the user equipment classifies the obtained security detection information according to result of each of detection items in the security detection information to determine security status information corresponding to the current wireless local area network. For example, the user equipment determines that the current wireless local area network is being monitored according to a detection result of SSL man-in-the-middle attack in the security detection information and according to a preset classification direction. As another example, the user equipment analyzes results of each of the detection items in the security detection information in combination with a security classification model to determine security status information of the current wireless local area network, and the security classification model comprises a classification model obtained by machine learning on the security classification sample information.

For example, a user holds a user equipment. The user equipment scans available wireless access points around, determines a target wireless access point based on the user's operation, and establishes the wireless connection with the target wireless access point. The user equipment obtains security detection information of the wireless local area network through the wireless connection with the wireless access point. For example, the user equipment determines corresponding security detection information by performing various security detection items on the wireless local area network. As another example, the user equipment transmits information related to the wireless local area network to the server. The server queries for the security detection information corresponding to the wireless local area network from a database according to the information related to the wireless local area network, and returns the security detection information to the user equipment. The user equipment determines security status information of the current wireless local area network according to the security detection information and according to a preset classification model or a security classification model determined by big data statistics. For example, according to network encryption detection of the security detection items in the security detection information which indicates that the network is unencrypted, the user equipment determines corresponding security status information which indicates that the network is unencrypted, that is, there is security risk in the current network.

In some embodiments, the method comprises Step S14 (not shown). At Step S14, when the security status information comprises risk information, the user equipment allocates a VPN channel for the user equipment based on the wireless connection. For example, when there is security risk in the wireless local area network where the user equipment is currently located, the user equipment establishes a VPN channel with a server for encrypted transmission of data based on the current wireless connection.

For example, when security status information of the wireless local area network comprises risk information which indicates that there is security risk, the user equipment establishes a VPN channel with a network device for encrypted transmission of data. For example, the user equipment self-builds a VPN in an app and establishes a VPN connection with a server via the VPN. In one embodiment, the user equipment establishes a VPN channel through a third-party application by invoking a third-party SDK to connect to a third-party server.

In some embodiments, at Step S12, the user equipment performs security detections on the wireless local area network where the user equipment is located to obtain security detection information of the wireless local area network. For example, the user equipment performs security detection items on currently connected wireless network locally, and obtains security detection information according to detection results of the security detection items.

In some embodiments, the user equipment transmits, to a network device, a request for the security detection information on the wireless local area network where the user equipment is located, and receives the security detection information returned by the network device, and the security detection information corresponds to the request for the security detection information. For example, a database of the network device stores the security detection information on various wireless local area network which is uploaded by the user equipment.

For example, the user equipment transmits, to the network device, a request for security detection information on the wireless local area network where the user equipment is located, according to information related to a target wireless access point. The request for security detection information comprises access point-related information of the target wireless access point, such as SSID of the access point, etc. The network device receives the access point-related information, retrieves and determines corresponding security detection information from a database according to the access point-related information, and returns the security detection information to the user equipment. Then, the user equipment receives the security detection information of the current wireless local area network returned by the network device.

In some embodiments, the security detection information includes, but is not limited to: detection result information of DNS spoofing; detection result information of ARP attack; detection result information of SSL man-in-the-middle attack; detection result information of a fake hotspot; detection result information of a WAP2 loophole in a hotspot; detection result information of connected devices; detection result information of network encryption. For example, the user equipment performs security detections on the wireless local area network where it is currently located, and obtains security detection information on the wireless local area network according to results of the security detections. The security detection information includes, but is not limited to: detection result information of DNS spoofing; detection result information of ARP attack; detection result information of SSL man-in-the-middle attack; detection result information of a fake hotspot; detection result information of a WAP2 loophole in a hotspot; detection result information of connected devices; detection result information of network encryption.

In some embodiments, the security detection information comprises detection result information of DNS spoofing. At Step S12, the user equipment obtains a data packet related to a target website, and the data packet is configured to request an IP address corresponding to a domain name of the target website. The user equipment determines a target IP address for receiving the data packet, and the target IP address is different from an IP address of the user equipment and an IP address of a DNS server in the wireless local area network where the user equipment is located.

The user equipment transmits the data packet to the target IP address as a DNS request. The user equipment determines whether there is a DNS spoofing attack in the wireless local area network according to a response data packet received by the user equipment.

For example, the user equipment obtains a data packet related to website A from a local buffer table based on history information on website browsing. The data packet comprises a header area and a Q&A (question and answer) area. The Q&A area of the data packet comprises Name: www.AAAAA.com. The user equipment obtains an IP address corresponding to the domain name www.AAAAA.com based on the data packet. The user equipment retrieves, from the system, an IP address of the user equipment itself as 10.252.2.16 and an address of the DNS server as 8.8.8.8. The user equipment determines a target device with a target IP address for receiving the data packet as any device located in the same wireless local area network, and the IP address of the target device is 10.255.1.15. The user equipment transmits the data packet comprising Name: www.AAAAA.com as a DNS request packet to IP 10.255.1.15, and then determines whether there is a DNS spoofing attack in the wireless local area network according to whether a response data packet is received.

In some embodiments, the security detection information comprises detection result information of ARP attack. At Step S12, the user equipment uses current MAC address information of a gateway device of a network where the user equipment is located as reference MAC address information. The user equipment performs delayed detection of whether the current MAC address information of the gateway device is the same as the reference MAC address information. The user equipment determines that there is ARP spoofing in the local area network if the current MAC address information of the gateway device is different from the reference MAC address information.

For example, the user equipment establishes a wireless connection with a wireless access point of a wireless router device. The IP address allocated for the current wireless access point is IP0, and the MAC address information of the wireless router device is MAC0. The user equipment retrieves MAC address information corresponding to the current IP0 as MAC1 from the current local ARP buffer table, and uses the MAC1 as the reference MAC address. As another example, the user equipment broadcasts an ARP request frame for the IP address information IP0 of the gateway in the wireless local area network, receives an ARP reply frame containing an MAC address of MAC1 corresponding to the IP0 which is returned by other devices, and uses the MAC1 as the reference MAC address. Then, after a time period, the user equipment retrieves MAC address information corresponding to the current IP0 from the current local ARP buffer table as MAC2, or obtains MAC address information corresponding to the current IP0 as MAC2 by broadcasting the IP0 in the wireless local area network, and compares MAC2 with MAC1 to find out if they are the same. If MAC2 obtained by the user equipment and MAC1 are different MAC address information, the user equipment determines that there is ARP spoofing in the current wireless local area network. In some embodiments, if a mobile terminal detects that the obtained MAC2 and MAC1 are the same MAC address information, the user equipment detects whether there are two different IP addresses corresponding to MAC2 in the local ARP buffer table. If so, then the mobile terminal determines there is ARP spoofing in the current wireless local area network. In some embodiments, a mobile terminal detects that there are two different IP addresses corresponding to MAC2 in the local ARP buffer table. Then the mobile terminal transmits, to the server, a request to obtain an MAC address corresponding to the wireless access point, and the request comprises BSSID corresponding to the wireless access point. The server receives the request, retrieves MAC address information corresponding to the BSSID from a database as MAC0, and returns correspondence between IP0 and MAC0 to the mobile terminal. The mobile terminal receives the correspondence between IP0 and MAC0, and compares the MAC0 with MAC2 to find out if they are the same. If the MAC0 and the MAC2 are different MAC address information, the mobile terminal determines that there is ARP spoofing in the current wireless local area network.

In some embodiments, the security detection information comprises SSL man-in-the-middle attack. At Step S12, the user equipment transmits an http access request to a target website which supports an https protocol, receives response information from the target website, and detects whether there is SSL man-in-the-middle attack in the current network of the user equipment according to the response information.

For example, the user equipment transmits an http access request to a target website supporting an https protocol through a browser. For example, the user equipment initiates an http access request to Website A. A user enters http://www.AAAAA.com in a browser. Then the user equipment receives response information of HTTP/1.1 200 OK transmitted by a website server of Website A. The user equipment acknowledges that the response information indicates that the access request is successfully completed, and then resource is transmitted to the user equipment. Since what the website uses is the https protocol, the access request starting with http goes smoothly. At this time, the user equipment detects an SSL man-in-the-middle attack in the current network. When the user enters http://www.AAAAA.com in the browser, the website page shows page timeout or page not found. Then the user equipment enters next website to detect.

Based on the above mentioned embodiments, as another example, the user equipment uses some third-party software or other means to detect whether the current wireless local area network is a fake hotspot, whether there is a WAP2 loophole in a hotspot, a number of connected devices in the network, and whether the network is encrypted. If it is detected that the current wireless local area network is a fake hotspot, or there is a WAP2 loophole in a hotspot, or the number of connected devices exceeds a preset number, or the network is unencrypted and the like, the user equipment determines that security status information of the current wireless local area network contains risk information. If no, the user equipment determines that the security status information of the current wireless local area network does not contain risk information.

As another example, the user equipment performs security detections on currently connected wireless local area network. The security detection includes, but is not limited to one or more of the above mentioned detection items. For example, the security detection items comprise: detection of DNS spoofing, detection of ARP attack, detection of SSL man-in-the-middle attack, detection of fake hotspot, detection of WAP2 loophole in a hotspot, detection of connected device, detection of network encryption, etc. If any of the security detection items is detected as indicating security risk, the user equipment determines that there is risk in the current wireless local area network. If all security detection items are detected as indicating no security risk, the user equipment determines that there is no risk in the current wireless local area network.

In some embodiments, at Step S13, the user equipment inputs the security detection information into a security classification model to obtain the security status information corresponding to the wireless local area network. In some embodiments, the security classification model is obtained by machine learning on a number of security classification sample information, and each of the security classification sample information comprises several security detection sample information and corresponding security status label information. For example, the security detection sample information comprise security detection information to be inputted into the security classification model, and the security status label information comprise security status information which is obtained from big data statistics, outputted from the security classification model, and easy to understand for users.

For example, the user equipment obtains security detection information of security detection items corresponding to the current wireless local area network, inputs security detection result information into a security classification model, and classifies security detection result information and determines security status information corresponding to the current wireless local area network through the model. The security classification model may be a classification model preset by a user. For example, if there is a detection result of a fake hotspot in the security detection results, corresponding security status information indicating that the current wireless local area network is a fake hotspot is outputted. The security classification model may also be obtained by machine learning on a number of security classification sample information. Each of the security classification sample information comprises several security detection sample information and corresponding security status label information. For example, the security classification sample information comprises a detection result which indicates that the network is unencrypted in the detection result information of network encryption, and the corresponding security status information comprises that the current network is unencrypted, etc. When the current security detection information of the user equipment comprises a detection result of network encryption which indicates that the network is unencrypted, security status information outputted by a security detection classification model comprises: the current wireless local area network is unencrypted, etc.

In some embodiments, the security classification model includes, but is not limited to: when the security detection information comprises the DNS spoofing and the ARP attack, the security status information of the wireless local area network comprises information which indicates that the wireless local area network would jump to a phishing website; and when the security detection information comprises the SSL man-in-the-middle attack and the ARP attack, the security status information of the wireless local area network comprises information which indicates that the wireless local area network would leak sensitive information.

For example, the user equipment classifies multiple security detection items with a security classification model to obtain security status information of the current wireless local area network. For example, according to whether there is detection result information of DNS spoofing and ARP attack in security detection information, the user equipment determines in the security classification model that the output result of the security classification model comprises security status information which indicates that the current wireless local area network would jump to a phishing website. As another example, by combining detection result information of SSL man-in-the-middle attack and ARP attack, the user equipment determines in the security classification model that the output result of the security classification model comprises security status information indicating whether the current wireless local area network would leak sensitive information, etc.

In some embodiments, the security status information includes, but is not limited to: whether the wireless local area network is encrypted; whether the wireless local area network is being monitored; whether the wireless local area network would jump to a phishing website; whether the wireless local area network would leak sensitive information; whether the wireless local area network is a fake hotspot; whether there is a WAP2 loophole in the wireless local area network; and a number of devices connected to the wireless local area network.

For example, the user equipment determines security status information of the current wireless local area network according to security detection information of various security detection items. For example, according to the fact that security detection information comprises DNS detection and ARP detection, it is determined that security status information of the current wireless local area network comprises information which indicates that the wireless local area network would jump to a phishing website. As an example, according to the fact that security detection information comprises ARP attack and SSL man-in-the-middle attack, the user equipment determines that security status information of the current wireless local area network comprises information which indicates that the wireless local area network would leak sensitive information. As another example, according to the fact that security detection information comprises information which indicates the network is unencrypted, the user equipment determines that security status information of the current wireless local area network comprises information which indicates the wireless local area network is unencrypted. As an example, according to the fact that security detection information comprises SSL man-in-the-middle attack, the user equipment determines that security status information of the current wireless local area network comprises information which indicates the wireless local area network is being monitored. As another example, according to the fact that security detection information comprises information which indicates the network is a fake hotspot, the user equipment determines that security status information of the current wireless local area network comprises information which indicates the wireless local area network is a fake hotspot. As an example, according to the fact that security detection information comprises information which indicates there is a WAP2 loophole, the user equipment determines that the security status information of the current wireless local area network comprises information which indicates there is a WAP2 loophole in the wireless local area network. As another example, according to the fact that security detection information comprises a number of connected devices of the current wireless local area network, the user equipment determines that security status information of the current wireless local area network comprises the number of connected devices of the wireless local area network.

In some embodiments, the method further comprises Step S15 (not shown). At Step S15, the user equipment presents the security status information on the user equipment.

For example, the user equipment determines the current security status information, and presents the security status information to a user to assist the user to make a decision on whether to take a measure to establish a secure wireless connection according to the current security status information.

In some embodiments, the method further comprises Step S16 (not shown). At Step S16, the user equipment presents the security detection result information on the user equipment when the security status information comprises risk information; and the user equipment allocates a VPN channel for the user equipment based on the wireless connection when a request for a VPN channel submitted by the user is obtained.

For example, when the user equipment determines that security status information of the current wireless local area network comprises risk information, the user equipment presents the security status information to the user and presents options of whether to establish a VPN channel to the user. If the user chooses Yes, the user equipment establishes a VPN channel with the server based on the user's selection operation.

In some embodiments, the method further comprises Step S17 (not shown). At Step S17, the user equipment transmits, to a corresponding network device, a request to connect to a wireless network which is submitted by the user through the user equipment, and receives access information on the target wireless access point which is returned by the network device based on the request to connect to the wireless network. At Step S11, the user equipment establishes the wireless connection between the user equipment and the target wireless access point based on the access information. In some embodiments, the target wireless access point is selected, by the network device, from available wireless access points around the user equipment, based on security evaluation information of wireless networks where the wireless access points are located. The network device stores correspondence between access point-related information of various wireless access points (for example, SSIDs (Service Set Identifiers), signal strength of the access points, etc.) and access information of the wireless access points, and also stores security evaluation information of various wireless access points which is obtained through comprehensive analysis on security status information of various wireless access points uploaded by users. For example, the user equipment scans for one or more available wireless access points around, transmits a request to connect to a wireless network to a network device, and the request to connect to the wireless network comprises information related to the one or more wireless access points. Then the network device determines security evaluation information corresponding to each of the wireless access points according to the information related to the one or more wireless access points, selects with preference and determines a target wireless access point. The network device further queries for access information of the target wireless access point, and returns the access information corresponding to the target wireless access point to the user equipment, where selecting with preference and determining the target wireless access point comprises selecting with preference and determining comprehensively according to security evaluation information of access point-related information (such as signal strength, etc.) of the wireless access point. The user equipment receives the access information of the target wireless access point, and establishes a wireless connection with the target wireless access point based on the access information.

In some embodiments, the method further comprises Step S18 (not shown). At Step S18, the user equipment transmits, to a corresponding network device, a query request for available wireless access points which is submitted by the user through the user equipment, and receives one or more available wireless access points returned by the network device based on the query request. Step S11 comprises Sub-step S111 (not shown), Sub-step S112 (not shown) and Sub-step S113 (not shown). At Step S111, the user equipment transmits, to the network device, a query request for access information on the target wireless access point, and the target wireless access point is selected by the user from the one or more available wireless access points. At Step S112, the user equipment receives access information on the target wireless access point returned by the network device. At Step S113, the user equipment establishes the wireless connection between the user equipment and the target wireless access point based on the access information. In some embodiments, at Step S112, the user equipment receives the one or more available wireless access points returned by the network device based on the query request, and security evaluation information of a wireless network where each of the available wireless access points is located, and the target wireless access point is selected by the user from the one or more available wireless access points based on the security evaluation information of the wireless network where each of the available wireless access points is located.

For example, the user equipment scans for available wireless access points around. The user equipment transmits access point-related information of the available wireless access points (such as SSIDs of access points, etc.) to the network device based on user's operation. The network device receives access point related information of the wireless access points, queries for security evaluation information corresponding to the wireless access points from a database based on the access point-related information, and selects the received wireless access points with preference according to the security evaluation information. For example, a wireless access point whose security status information uploaded in security evaluation information is higher than a threshold is selected as a preferred wireless access point. One or more preferred wireless access points are returned to the user equipment. The user equipment receives the one or more wireless access points and presents the one or more available wireless access points. In some embodiments, security evaluation information corresponding the one or more wireless access points are presented while the one or more wireless access points are presented. For example, a wireless access point with security evaluation information shown in green color has higher security. The user equipment determines a target wireless access point comprehensively, based on signal strength, security evaluation information of each of the wireless access points. In one embodiment, the user equipment determines corresponding target wireless access point based on a user's operation, and transmits a query request for access point information to the network device, and the query request for access point information comprises access point-related information of the target wireless access point. The network device retrieves access information corresponding to the target wireless access point from a database according to the access point-related information, and returns the access information to the user equipment. The user equipment receives the access information, and establishes a wireless connection with the target wireless access point based on the access information.

The present application also provides a computer readable storage medium storing computer codes thereon, and the computer codes when executed, cause the method as recited in any one of the above-mentioned clauses to be performed.

The present application also provides a computer program product, and the computer program product when executed by a computer device, cause the method as recited in any one of the above-mentioned clauses to be performed.

The present application also provides a computer device. The computer device comprises:

one or more processors;

a memory for storing one or more computer programs;

and the one or more computer programs, when executed by the one or more processors, cause the one or more processors to implement the method as recited in any one of above-mentioned clauses.

It should be noted that the present application can be implemented in software and/or a combination of software and hardware, for example, by using an application specific integrated circuit (ASIC), a general purpose computer, or any other similar hardware device. In one embodiment, the software program of the present application can be executed by a processor to implement the steps or functions described above. Likewise, the software programs (including related data structures) of the present application can be stored in a computer readable storage medium such as a RAM memory, a magnetic or optical drive or a floppy disk and the like. In addition, some of the steps or functions of the present application may be implemented in hardware, for example, as a circuit that cooperates with a processor to perform various steps or functions.

In addition, a portion of the present application can be embodied as a computer program product, such as computer program instructions, when executed by a computer, can invoke or provide a method and/or embodiments in accordance with the present application. In some embodiments, computer program instructions exist in a computer-readable medium in a form of including, but not limited to, a source file, an executable file, an installation package file, and the like. Correspondingly, the manner in which a computer program instruction is executed by a computer includes, but is not limited to, the computer directly executing the instruction, or the computer compiling the instruction and then executing the corresponding compiled program, or the computer reading and executing the instruction, or the computer reading and installing the instruction and then executing the corresponding post-installation program. Here, the computer-readable medium can be any available computer-readable storage medium or communication medium that can be accessed by a computer.

Communication medium includes medium by which communication signals which include, for example, computer-readable instructions, data structures, program modules, or other data, are transmitted from one system to another. Communication medium can include guided transmission medium (such as cables and wires (e.g., fiber optics, coaxial, etc.)) and wireless (non-conductive transmission) medium that can propagate energy waves, such as sound, electromagnetic, RF, microwave, and infrared. Computer readable instructions, data structures, program modules or other data may be embodied, for example, as a modulated data signal in a wireless medium, such as a carrier wave or a similar mechanism such as being embodied as part of a spread spectrum technology. The term "modulated data signal" refers to a signal whose one or more characteristics are altered or set by encoding information in the signal. Modulation can be analog, digital, or can be hybrid modulation techniques.

By way of example and not limitation, computer-readable storage medium may include volatile and non-volatile, removable and non-removable medium implemented by any method or technology used to store information such as computer readable instructions, data structures, program modules or other data. For example, computer-readable storage medium includes, but is not limited to, volatile memory such as random access memory (RAM, DRAM, SRAM); and non-volatile memory such as flash memory, various read-only memories (ROM, PROM, EPROM, EEPROM), magnetic and ferromagnetic/ferroelectric memory (MRAM, FeRAM); and magnetic and optical storage devices (hard disk, cassette, CD, DVD); or other existing or known medium or any medium to be developed in the future that can store computer-readable information/data for use by computer systems.

What is claimed is:

1. A method for detecting wireless network security, the method comprising:
   establishing a wireless connection between a user equipment and a target wireless access point;
   obtaining security detection information of a wireless local area network where the user equipment is located; and
   classifying the security detection information and determining security status information corresponding to the wireless local area network based on the security detection information, including inputting the security detection information into a security classification model to obtain the security status information corresponding to the wireless local area network, wherein the security classification model comprises at least one of:
   when the security detection information comprises the DNS spoofing and the ARP attack, the security status information of the wireless local area network comprises information which indicates that the wireless local area network would jump to a phishing website;
   when the security detection information comprises the SSL man-in-the-middle attack and the ARP attack, the security status information of the wireless local area network comprises information which indicates that the wireless local area network would leak sensitive information.

2. The method according to claim 1, wherein the method further comprising:
   allocating a Virtual Private Network (VPN) channel for the user equipment based on the wireless connection when the security status information comprises risk information.

3. The method according to claim 1, wherein the step of obtaining the security detection information of the wireless local area network where the user equipment is located comprising:
   performing security detections on the wireless local area network where the user equipment is located to obtain the security detection information of the wireless local area network.

4. The method according to claim 1, wherein the step of obtaining the security detection information of the wireless local area network where the user equipment is located comprising:
   transmitting, to a network device, a request for the security detection information of the wireless local area network where the user equipment is located; and
   receiving the security detection information returned by the network device, wherein the security detection information corresponds to the request for the security detection information.

5. The method according to claim 1, wherein the security detection information comprises at least any one of:
   detection result information of Domain Name System (DNS) spoofing;
   detection result information of Address Resolution Protocol (ARP) attack;
   detection result information of Secure Sockets Layer (SSL) man-in-the-middle attack;
   detection result information of a fake hotspot;
   detection result information of a Wireless Application Protocol 2(WAP2) loophole in a hotspot;
   detection result information of connected devices; and
   detection result information of network encryption.

6. The method according to claim 5, wherein the security detection information comprises detection result information of DNS spoofing;
   wherein the step of obtaining the security detection information of the wireless local area network where the user equipment is located comprises:

obtaining a data packet of a target website, wherein the data packet is configured to request an IP address corresponding to a domain name of the target website;

determining a target IP address for receiving the data packet, wherein the target IP address is different from an Internet Protocol (IP) address of the user equipment and an IP address of a DNS server in the wireless local area network where the user equipment is located;

transmitting the data packet to the target IP address as a DNS request; and determining whether there is a DNS spoofing attack in the wireless local area network according to a response data packet received by the user equipment.

7. The method according to claim 5, wherein the security detection information comprises detection result information of ARP attack;

wherein the step of obtaining the security detection information of the wireless local area network where the user equipment is located comprises:

using current Media Access Control Address (MAC) address information of a gateway device of a network where the user equipment is located as reference MAC address information;

performing delayed detection of whether the current MAC address information of the gateway device is the same as the reference MAC address information; and determining that there is ARP spoofing in the local area network if the current MAC address information of the gateway device is different from the reference MAC address information.

8. The method according to claim 5, wherein the security detection information comprises SSL man-in-the-middle attack;

wherein the step of obtaining the security detection information of the wireless local area network where the user equipment is located comprises:

transmitting an http access request to a target website which supports an https protocol;

receiving response information from the target website; and detecting whether there is SSL man-in-the-middle attack in a current network of the user equipment according to the response information.

9. The method according to claim 1, wherein the security classification model is obtained by machine learning on a number of security classification sample information, wherein each of the security classification sample information comprises several security detection sample information and corresponding security status label information.

10. The method according to claim 1, wherein the security status information comprises at least one of:

whether the wireless local area network is encrypted;

whether the wireless local area network is being monitored;

whether the wireless local area network would jump to a phishing website;

whether the wireless local area network would leak sensitive information;

whether the wireless local area network is a fake hotspot;

whether there is a WAP2 loophole in the wireless local area network; and a number of devices connected to the wireless local area network.

11. The method according to claim 10, wherein the method further comprising:

presenting the security status information on the user equipment.

12. The method according to claim 10, wherein the method further comprising:

presenting security detection result information on the user equipment when the security status information comprises risk information; and allocating a VPN channel for the user equipment based on the wireless connection when a request for a VPN channel submitted by a user is obtained.

13. The method according to claim 1, wherein the method further comprising:

transmitting, to a corresponding network device, a request to connect to a wireless network which is submitted by a user through the user equipment;

receiving access information of the target wireless access point returned by the network device based on the request to connect to the wireless network;

wherein the step of establishing the wireless connection between the user equipment and the target wireless access point comprises:

establishing the wireless connection between the user equipment and the target wireless access point based on the access information.

14. The method according to claim 13, wherein the target wireless access point is selected, by the network device, from available wireless access points around the user equipment, based on security evaluation information of wireless networks where the wireless access points are located.

15. The method according to claim 1, wherein the method further comprising:

transmitting, to a corresponding network device, a query request for available wireless access points which is submitted by a user through the user equipment;

receiving one or more available wireless access points returned by the network device based on the query request;

wherein the step of establishing the wireless connection between the user equipment and the target wireless access point comprises:

transmitting, to the network device, a query request for access information of the target wireless access point, wherein the target wireless access point is selected by the user from the one or more available wireless access points;

receiving access information of the target wireless access point returned by the network device; and establishing the wireless connection between the user equipment and the target wireless access point based on the access information.

16. The method according to claim 15, wherein the step of receiving the one or more available wireless access points returned by the network device based on the query request comprising:

receiving the one or more available wireless access points returned by the network device based on the query request, and security evaluation information of a wireless network where each of the available wireless access points is located;

wherein the target wireless access point is selected by the user from the one or more available wireless access points based on the security evaluation information of the wireless network where each of the available wireless access points is located.

17. A device for establishing a secure wireless connection, the device comprising:

a processor; and a memory arranged to store computer executable instructions, wherein the executable instructions, when executed, cause the processor to perform the following operations:

establishing a wireless connection between a user equipment and a target wireless access point;

obtaining security detection information of a wireless local area network where the user equipment is located; and classifying the security detection information and determining security status information corresponding to the wireless local area network based on the security detection information, including inputting the security detection information into a security classification model to obtain the security status information corresponding to the wireless local area network, wherein the security classification model comprises at least one of:

when the security detection information comprises the DNS spoofing and the ARP attack, the security status information of the wireless local area network comprises information which indicates that the wireless local area network would jump to a phishing website;

when the security detection information comprises the SSL man-in-the-middle attack and the ARP attack, the security status information of the wireless local area network comprises information which indicates that the wireless local area network would leak sensitive information.

18. A non-transitory computer readable medium comprising instructions, wherein the instructions, when executed, cause a system to perform the following operations:

establishing a wireless connection between a user equipment and a target wireless access point;

obtaining security detection information of a wireless local area network where the user equipment is located; and classifying the security detection information and determining security status information corresponding to the wireless local area network based on the security detection information, including inputting the security detection information into a security classification model to obtain the security status information corresponding to the wireless local area network, wherein the security classification model comprises at least one of:

when the security detection information comprises the DNS spoofing and the ARP attack, the security status information of the wireless local area network comprises information which indicates that the wireless local area network would jump to a phishing website;

when the security detection information comprises the SSL man-in-the-middle attack and the ARP attack, the security status information of the wireless local area network comprises information which indicates that the wireless local area network would leak sensitive information.

* * * * *